US006674452B1

(12) United States Patent
Kraft et al.

(10) Patent No.: US 6,674,452 B1
(45) Date of Patent: Jan. 6, 2004

(54) GRAPHICAL USER INTERFACE TO QUERY MUSIC BY EXAMPLES

(75) Inventors: Reiner Kraft, Gilroy, CA (US); Qi Lu, San Jose, CA (US); Shang-Hua Teng, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/543,218

(22) Filed: Apr. 5, 2000

(51) Int. Cl.[7] .............................................. G06F 17/30
(52) U.S. Cl. ...................................... 345/765; 707/102
(58) Field of Search ................................ 345/700, 762, 345/765, 764; 707/6, 102

(56) References Cited

U.S. PATENT DOCUMENTS

| 5,179,718 A | 1/1993 | MacPhail |
| 5,286,908 A | 2/1994 | Jungleib |
| 5,467,288 A | 11/1995 | Fasciano et al. |
| 5,533,903 A | 7/1996 | Kennedy |
| 5,536,902 A | 7/1996 | Sera et al. |
| 5,553,002 A | 9/1996 | Dangelo et al. |
| 5,557,424 A | 9/1996 | Panizza |
| 5,574,915 A | 11/1996 | Lemon et al. |
| 5,585,583 A | 12/1996 | Owen |
| 5,604,100 A | 2/1997 | Perlin |
| 5,657,221 A | 8/1997 | Warman et al. |
| 5,715,318 A | 2/1998 | Hill et al. |
| 5,734,119 A | 3/1998 | France et al. |
| 5,734,633 A | 3/1998 | Magner et al. |
| 5,757,386 A | 5/1998 | Celi, Jr. et al. |
| 5,787,413 A | 7/1998 | Kauffman et al. |
| 5,792,972 A | 8/1998 | Houston |
| 5,802,524 A | 9/1998 | Flowers et al. |
| 6,161,142 A | * 12/2000 | Wolfe et al. ................. 709/230 |
| 6,539,395 B1 | * 3/2003 | Gjerdingen et al. ........ 707/102 |

FOREIGN PATENT DOCUMENTS

| JP | 061695 | 9/1997 |
| WO | WO 97/50076 A1 | 12/1997 |
| WO | WO 98/01842 A1 | 1/1998 |

OTHER PUBLICATIONS

"Compressed Musical Instrument Digital Interface Editor Application View", IBM Technical Disclosure Bulletin, v. 38 No. 01, pp. 577–578, Jan., 1995, IBM Corporation, Armonk, NY.

* cited by examiner

*Primary Examiner*—Cao (Kevin) Nguyen
(74) *Attorney, Agent, or Firm*—Kurdika & Jobse, LLP

(57) ABSTRACT

A According to the invention, a music search system includes a music player, music analyzer, a search engine and a sophisticated user interface that enables users to visually build complex query profiles from the structural information of one or more musical pieces. The complex query profiles are useful for performing searches for musical pieces matching the structural information in the query profile. The system allows the user to supply an existing piece of music, or some components thereof, as query arguments, and lets the music search engine find music that is similar to the given sample by certain similarity measurement.

20 Claims, 9 Drawing Sheets

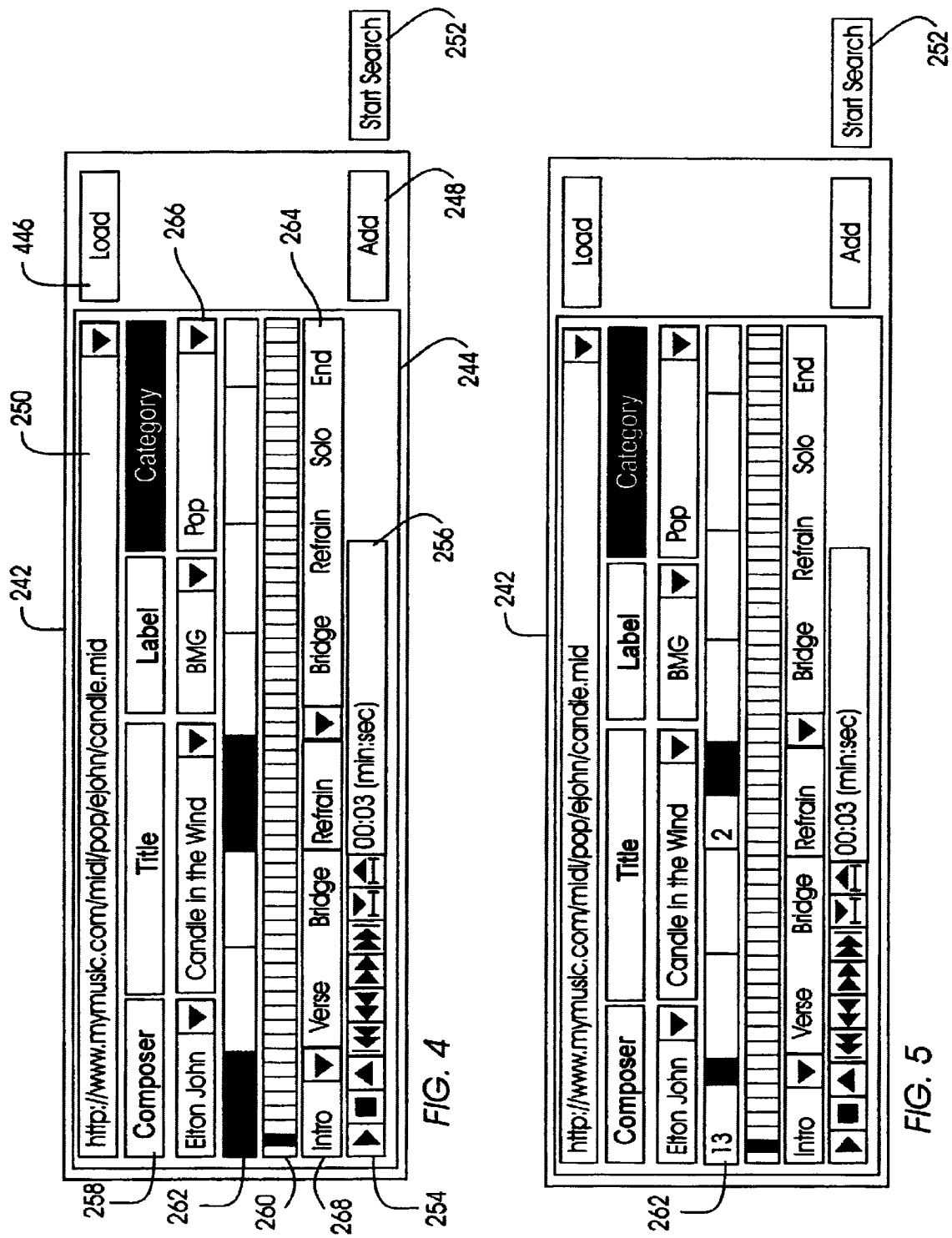

GRAPHICAL USER INTERFACE TO QUERY MUSIC BY EXAMPLES

RELATED APPLICATIONS

This application is one of four related applications filed on an even date herewith and commonly assigned, the subject matters of which are incorporated herein by reference for all purposes, including the following:

U.S. patent application Ser. No. 09/543,11 1, entitled "Method and Apparatus for Updating a Design by Dynamically Querying an Information Source to Retrieve Related Information", filed Apr. 5, 2000, now abandoned;

U.S. patent application Ser. No. 09/543,230, entitled "Method and Apparatus for Determining the Similarity of Complex Designs", filed Apr. 5, 2000, now abandoned; and U.S. patent application Ser. No. 09/543,715, entitled "Method and Apparatus for Music summarization And Creation of Audio Summaries", filed Apr. 5, 2000, now U.S. Pat. No. 6,225,546.

FIELD OF THE INVENTION

This invention relates generally to data analysis, and, more specifically to a techniques for searching for music via examples.

BACKGROUND OF THE INVENTION

Audio data is becoming an increasingly important part of Internet commerce.

Based on statistics from search engines such as HotBot and Altavista, the Web concurrently contains about 2 million audio files and the number is growing at a rapid pace. Most of the audio files stores music content, used for various purposes ranging from simply enhancing the multimedia presence of Web sites, to promotion of music product such as new songs and CDs from major content label to small independent label. It is evident that the online music content will play an increasingly important role in online music distribution (e.g., CDNow, Amazon, Music Blvd, etc) and online entertainment (e.g., netradio).

Currently, however, there are no tools available that enable the users to effectively search music content. Some search engines and Web sites offer search capabilities for audio files, but the users can only search them using text queries. This is insufficient because acoustic features and properties of a piece of music cannot be easily described by text. For example, if you listen to a song and particularly enjoyed the melody, and would like find more songs with a similar melody, there are no tools available to perform such a search, since, this kind of search cannot be done using text queries. In addition, the graphic user interfaces for text searching tools are typically very rudimentary and do not allow for complex or compound queries, in most cases.

Accordingly, a need exists for a system and method whereby users may search for musical pieces using structural information of sample pieces as the search query profile.

Accordingly, a need exists for a system and method whereby users may search for musical pieces using structural information of multiple sample pieces with a complex search query profile.

Accordingly, a need exists for a system and method whereby users may visually build complex query profiles for musical searches from the structural information of one or more musical pieces.

SUMMARY OF THE INVENTION

According to the invention, a system and method enables users to visually build complex query profiles from the structural information of one or more musical pieces, the complex query profiles useful for performing searches for musical pieces matching the structural information in the query profile. With the inventive system, the user supplies an existing piece of music, or some components thereof, as query arguments, and lets the music search engine find music that is similar to the given sample by certain similarity measurement.

The system comprises a graphical user interface (GUI) integrated with a music player and a music analyzer. The GUI enables the user to search music by using an existing song or components of a song and the relationship between selected components. The integration of the query interface with a music player allows the user to sample and adjust the formation of the query interactively. The function of the music player is to interpret the music semantics of the data format and render the content through an audio engine. The music analyzer also understands the format of the music data and performs a structural analysis of the content based on the type of the music and structural properties of the music as described by the existing music theories. The music analyzer decomposes a piece of music (song or only part of a song) into a sequence of structural sub-components. The sequence of structural components generated by the music analyzer serves as the basic components for formulating the query. The GUI displays these components in a visual form, which is clear and easy to understand for the users, providing the basic functionality for the user to select the components and define the relation among the selected components to serve as the query input. The inventive system also provides a flexible query expansion mechanism that allow the user to combine content from different multiple pieces of existing music to form powerful complex queries to find the desired music.

According to one aspect of the present invention, a method for creating queries useful in searching for musical content comprises: (a) receiving data defining at least a first musical piece; (b) decomposing the first musical piece into a structural representation of the first musical piece; (c) displaying the structural representation of the first musical piece; (d) receiving selection criteria identifying at least a portion of the structural representation of the first musical piece; and (e) creating a query profile from the identified portion of the structural representation of the first musical piece.

According to a second aspect of the invention, a computer program product for use with a computer apparatus comprises: (a) program code configured to receive data defining at least a first musical piece; (b) program code configured to decompose the first musical piece into a structural representation of the first musical piece; (c) program code configured to display the structural representation of the first musical piece; (d) program code configured to receive selection criteria identifying at least a portion of the structural representation of the first musical piece; and (e) program code configured to create a query profile from the identified portion of the structural representation of the first musical piece.

According to a second third aspect of the invention, an apparatus for creating queries useful in searching for musical content comprises: (a) a music analyzer configured to receive computer-readable data representing a first musical piece and configured to generate from the computer-readable data a plurality of components representing structural elements of the musical piece; (b) a user interface configured to display the structural representation of the first musical piece; (c) program logic coupled to the user interface and configured to receive selection criteria identifying at least a portion of the structural representation of the first musical piece; and (d) a query generator is configured to create a query profile from the identified portion of the structural representation of the first musical piece.

BRIEF DESCRIPTION OF THE DRAWINGS

The above and other features, objects and advantages of the invention will be better understood by referring to the following detailed description in conjunction with the accompanying drawing in which:

FIG. 4 illustrates a graphic user interface in accordance with the present invention;

FIG. 5 illustrates a graphic user interface in accordance with the present invention;

DETAILED DESCRIPTION

Figure 1:
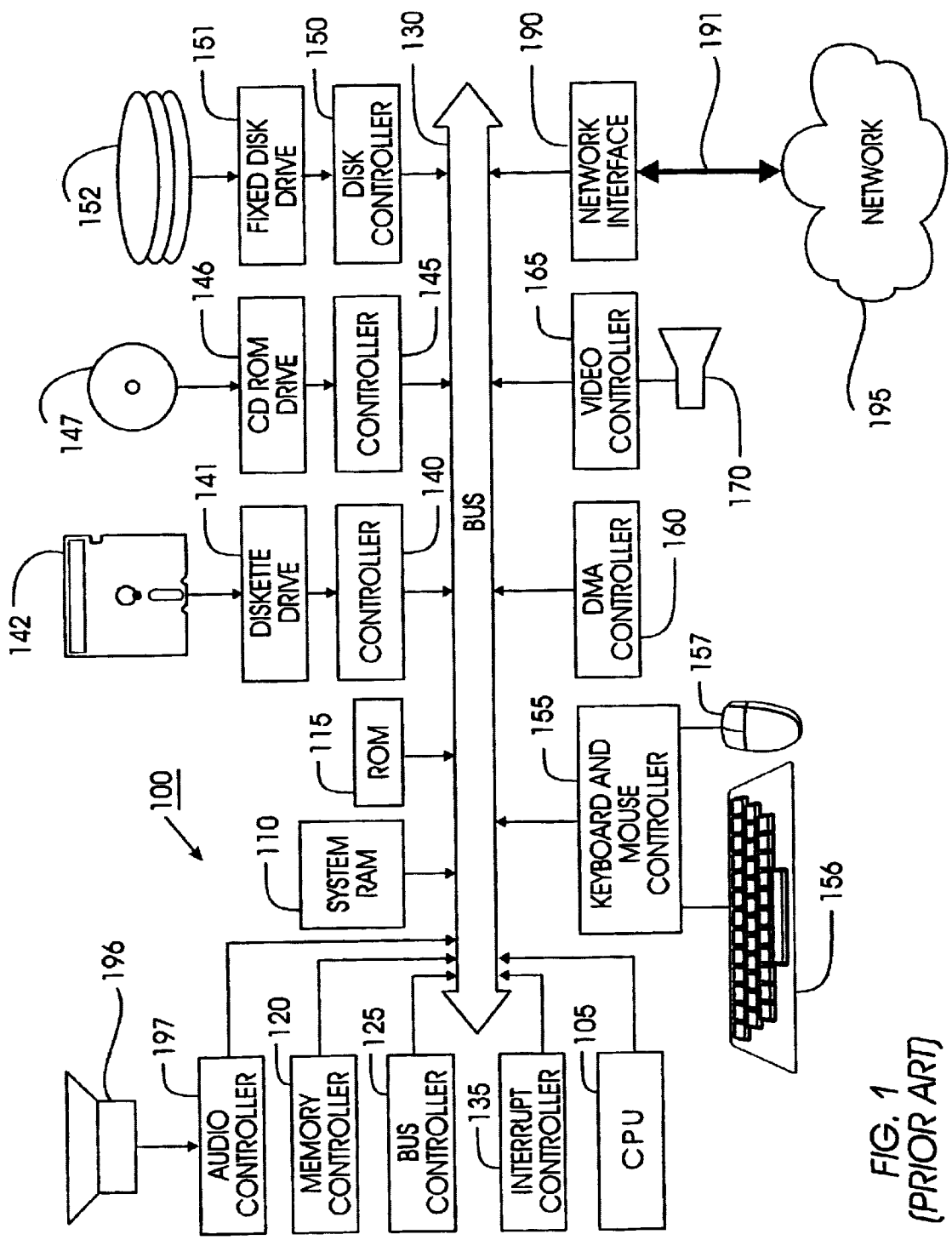
FIG. 1 is a block diagram of a computer system suitable for use with the present invention.

FIG. 1 illustrates the system architecture for a computer system 100 such as an IBM Aptiva Personal Computer (PC), on which the invention may be implemented. The exemplary computer system of FIG. 1 is for descriptive purposes only. Although the description may refer to terms commonly used in describing particular computer systems, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, commercially available from International Business Machines Corporation, Boca Raton, Fla., or Windows NT®, commercially available from MicroSoft Corp., Redmond, Wash. The operating system controls allocation of system resources and performs tasks such as processing scheduling, memory management, networking, and I/O services, among things. In particular, an operating system resident in system memory and running on CPU 105 coordinates the operation of the other elements of computer system 100. The present invention may be implemented with any number of commercially available operating systems including OS/2, UNIX, DOS, and WINDOWS, among others. One or more applications such as Lotus NOTES™, commercially available from Lotus Development Corp., Cambridge, Mass. may execute under the control of the operating system. If the operating system is a true multitasking operating system, such as OS/2, multiple applications may execute simultaneously.

Figure 2:
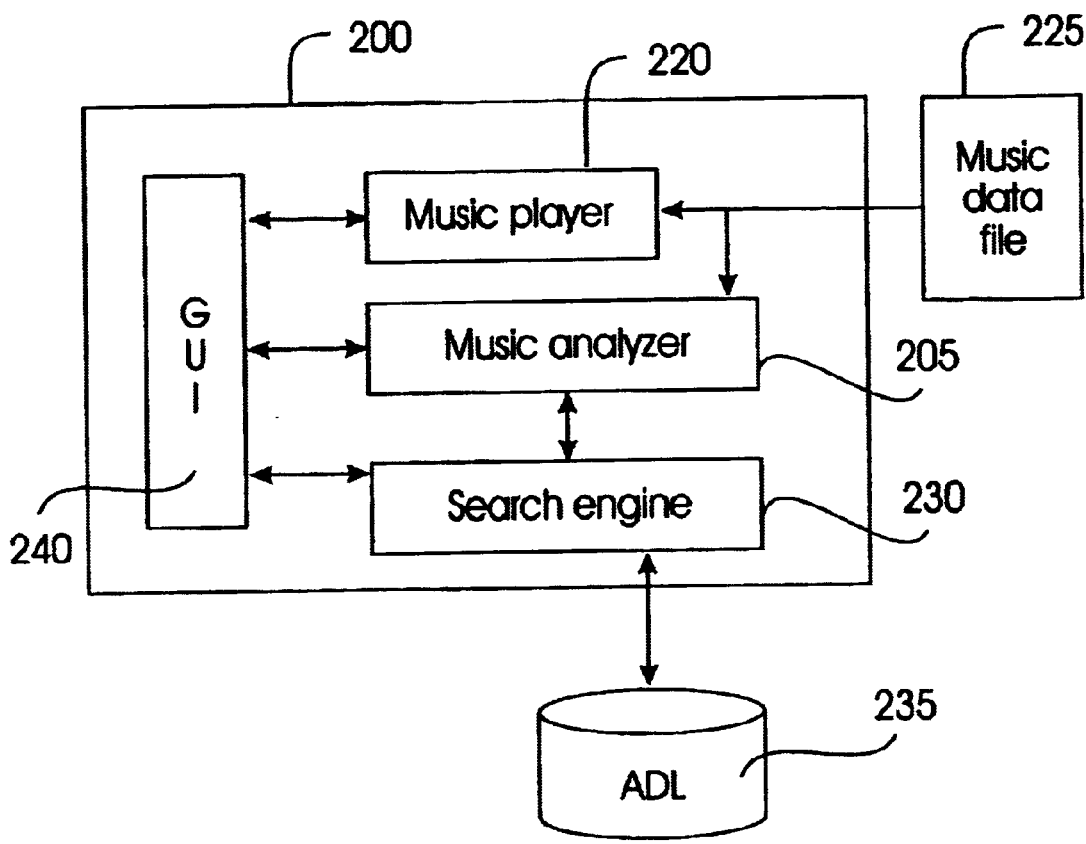
FIG. 2 is a conceptual block diagram of the inventive system in accordance with the present invention.

FIG. 2 illustrates conceptually the main components of a music search system 200 in accordance with the present invention, along with various input and library files. Specifically, system 200 may be implemented as an all software application executable on a hardware platform and operating system as described above. System 200 comprises a music analyzer 205, a music player 220, a search engine 230, and a Graphic User Interface (GUI) 240. Also shown in FIG. 2, although not part of system 200, is a music data file 225 and a Active Digital Library (ADL) 235.

Graphic User Interface

Figure 6:
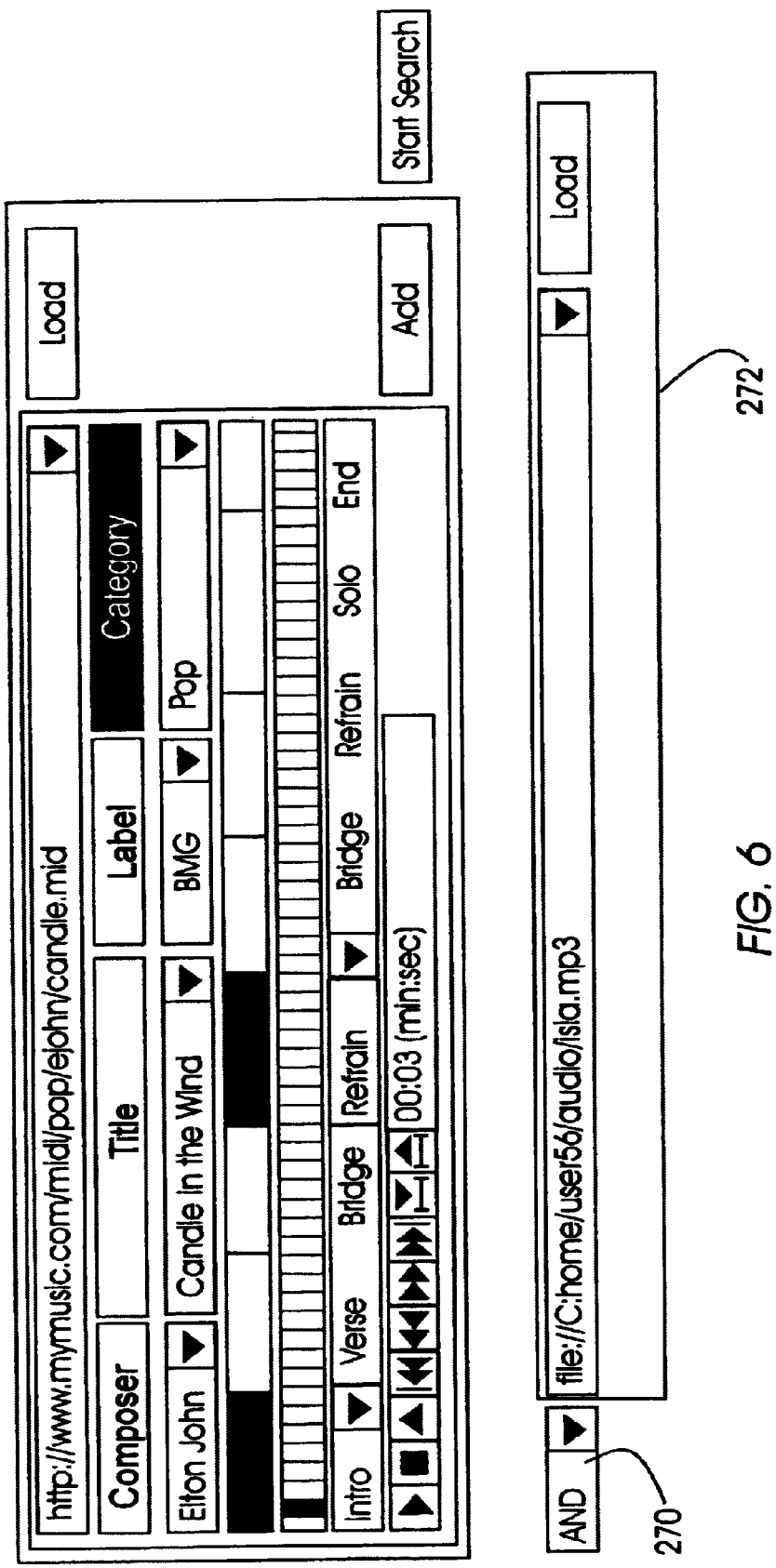
FIG. 6 illustrates a graphic user interface in accordance with the present invention.
Figure 7:
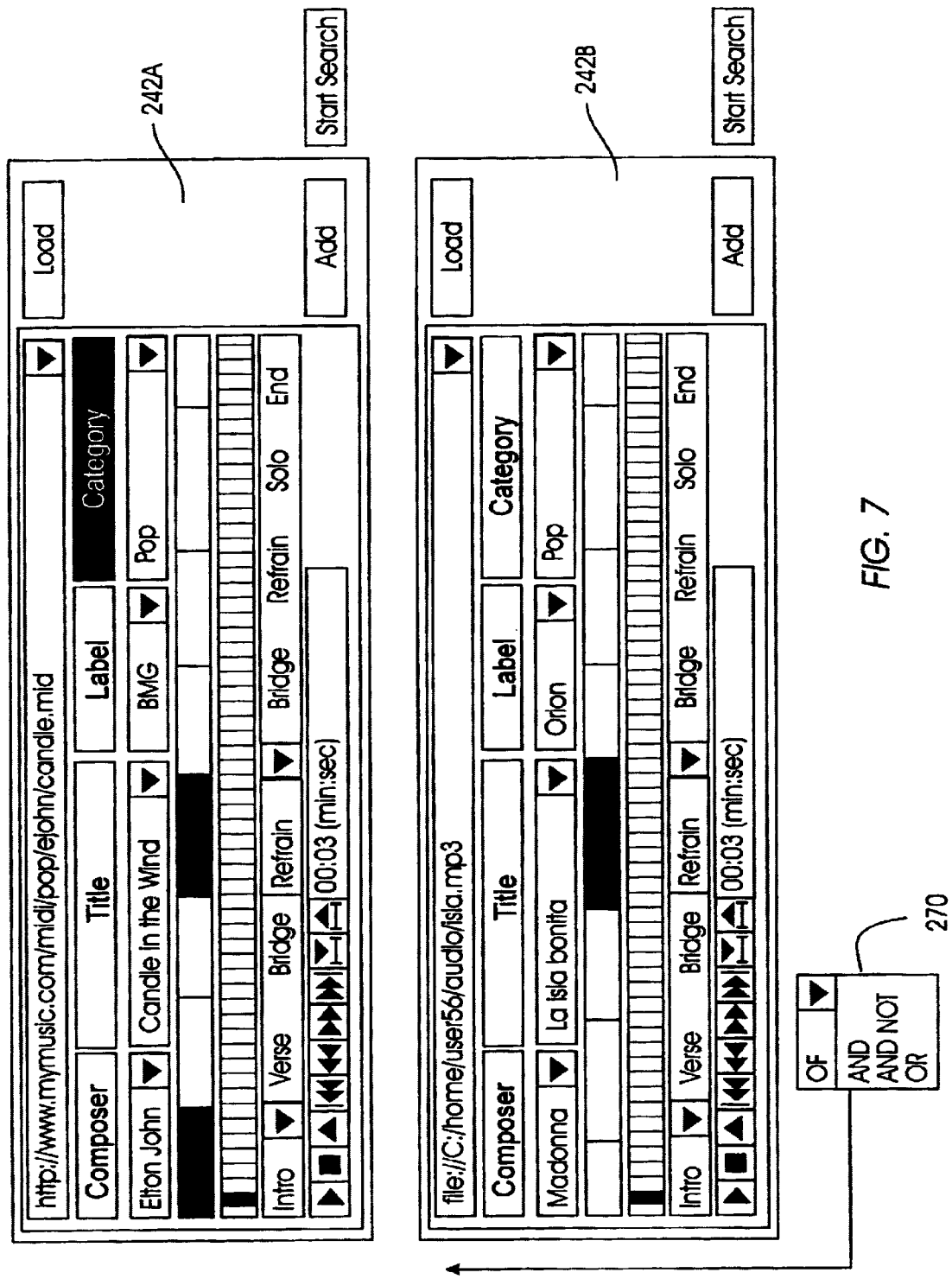
FIG. 7 illustrates a graphic user interface in accordance with the present invention.
Figure 8:
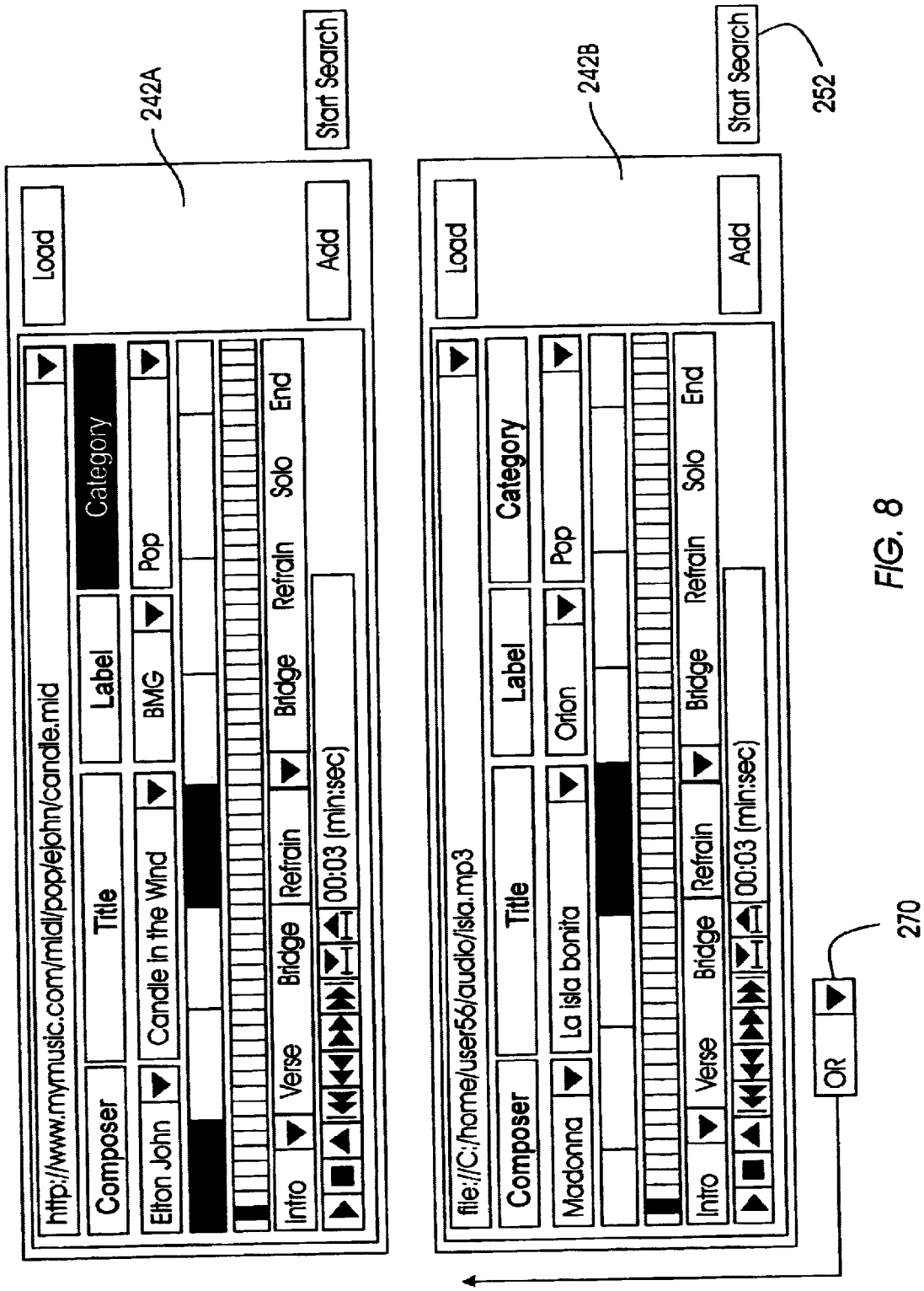
FIG. 8 illustrates a graphic user interface in accordance with the present invention.

In the illustrative embodiment, GUI 240 has the appearance and functions as described with reference to FIGS. 4–8 which illustrate the various dynamic configurations of the elements of GUI 240. In the illustrative embodiment, GUI 240 comprises a main window 242, and a Start Search button 252. Contained within a primary main window 242A are a Load button 446, an Add button 248 and a secondary window 244. Contained within secondary window 244 are a music player tool bar 254, a time window 256, a component graph 260, a component caption bar 264, a temporal sequence dialog box 262, a music data dialog box 266, a music data legend bar 258 and an address dialog box 250. As illustrated in FIGS. 6–8, GUI 240 may further a second main window 242B, having contents similar to primary main window 242A, and a Boolean operator dialog box 270.

GUI 240 may be designed to obey the standard user interface guidelines of the native operating systems and one or more browser window framing capabilities. The drag and drop functionality of the GUI 240 may utilize the standard Windows® drag and drop interface. The button controls of GUI 240 may be implemented using well known techniques, as would be understood by those reasonably skilled in the arts. Music player tool bar 254 contains toggle buttons to control playback of music. The toolbar contains standard CD_ROM player controls over playback (play, pause, fast-forward, rewind, etc.) which may be adapted to playback of either audio files or MIDI files.

Music player 220, may be implemented as a software application executable in conjunction with a standard audio card with MIDI samples contained thereon, such as a wave table synthesis card, or may be implemented with a special purposed audio engine card. Music player 220 is intended to play both audio wave files, such as file 300, or MIDI files, such as file 304. The structure and function of such a player may be performed with any number of commercially available music player and MIDI player and is within the scope of those skilled in the arts.

Music Analyzer

Figure 3:
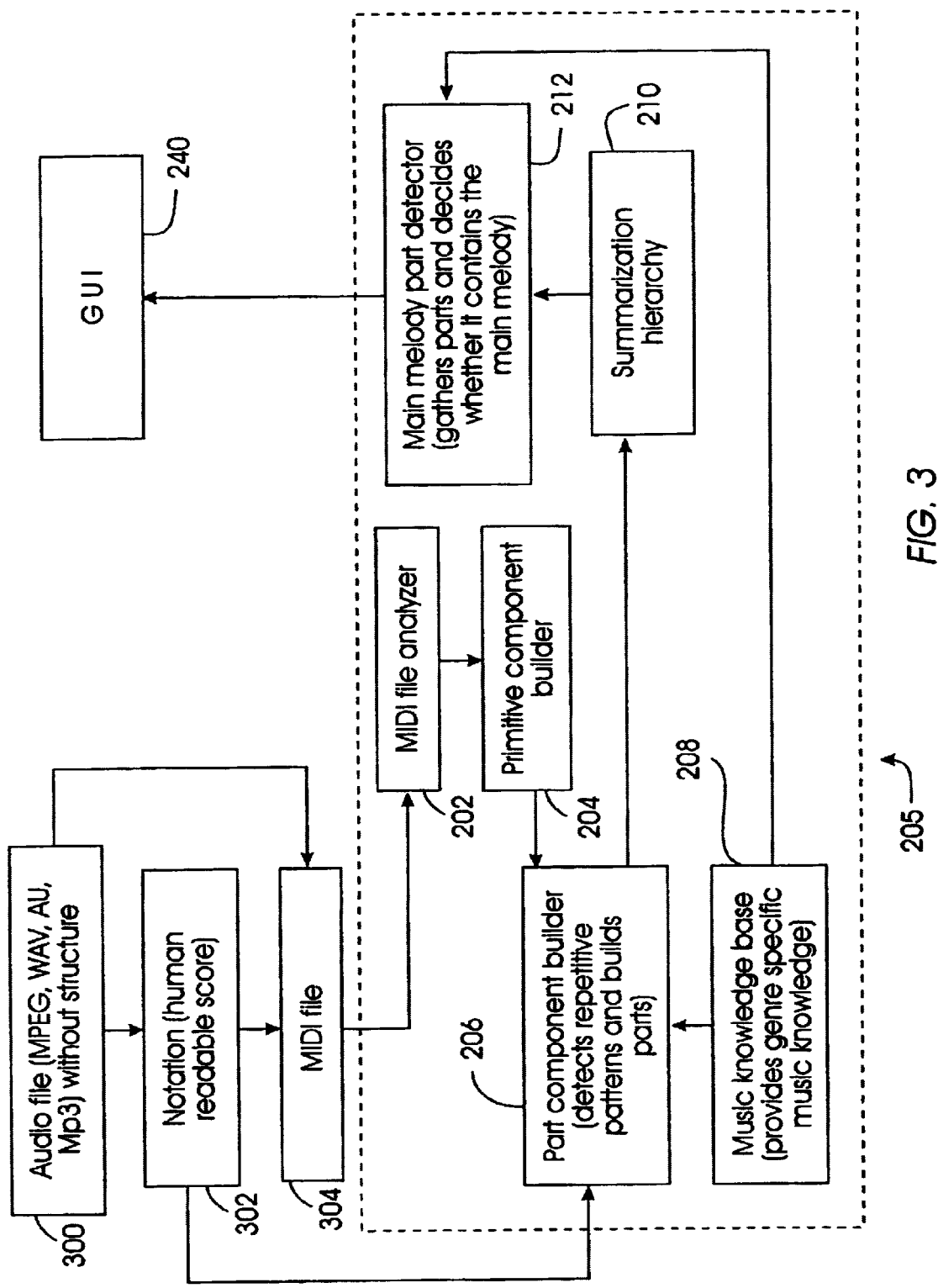
FIG. 3 is the a screen conceptual block diagram illustrating the music analyzer of FIG. 2 in accordance with the present invention.

Music analyzer 205, as illustrated in FIG. 3, comprises a MIDI file analyzer 202, a primitive component builder 204, a part component builder 206, a music knowledge base 208, and a melody detection engine 212. In addition, FIG. 3 also illustrates examples of file 225, namely, audio file 300, score 302 and/or MIDI file 304, and the interim data structure used by a melody detection engine 212, i. e. summarization hierarchy 210. The individual constructions and functions of the components of music analyzer 205 are described in detail in the previously referenced U.S. patent application Ser. No. 09/543,715, entitled "Method and Apparatus For Music Summarization And Creation of Audio Summaries". In the preferred embodiment, file 225 contains MIDI data describing a musical piece. Other techniques for converting an audio file of a human readable score notation, as described in the above referenced co-pending application and are not repeated here for brevity.

Briefly, system 205 parses the song data and generates the missing structural information. First, MIDI file analyzer 202 analyzes the MIDI data file 304 to arrange the data in standard track-by-track format. Next, primitive component builder 204 parses the MIDI file into MIDI primitive data, such as note on and note off data, note frequency (pitch) data, time stamp data associated with note on and note off events, time meter signature, etc. Next, part component builder 206 generates parts from the parsed MIDI data primitives by detecting repetitive patterns within the MIDI data primitives and building parts therefrom. In an alternative embodiment of the present invention, part component builder 206 may also generate parts from a human readable score notation such as that of file 302. The information on how tracks are arranged is stored in a part component generated by part component builder 206.

The part component builder 206 comprises program code which, given the output from primitive component builder 204, detects repetitive patterns and builds the summarization hierarchy of the musical piece. To better understand the process by which part component builder 206 generates a summarization hierarchy of a song, the components which comprise the song and the hierarchical structure of these components are described briefly hereafter.

In accordance with the present invention, a song or musical piece, referred to hereafter as a composite component (c-components), consists typically of the following components:

Song
Parts
Tracks
Measures
Notes

Notes are primitive components (p-components), i.e. atomic level data, that do not contain sub-components. Tracks, Parts, Measures and Song are composite to components (c-components) and may contain sequence information, for example in form of an interconnection diagram (i-Diagram).

All components are allowed to have attributes. Attributes identify the behavior, properties and characteristic of a component and can be used to perform a similarity check. Attributes are distinguished between fixed attributes and optional attributes. Fixed attributes are required and contain basic information about a component. For instance one of a measure's fixed attribute is its speed, i.e. beats per minute. Optional attributes however could be additional information the user might want to provide, such as genre, characteristic or other useful information. The data structure of additional information is not limited to attribute value pairs. In order to provide a hierarchy use is made of Extended Markup Language (XML) and provide a document type definition (DTD) for each components optional attribute list. In the illustrative embodiment, note that p-components are not allowed to have optional attributes.

Components can be connected by forming a hierarchical structure. Therefore a simple grammar, for example in BNF form, can be used to describe the hierarchical structure, as illustrated below:

SONG::=Part+
Part::=Track+
Track::=Measure+
Measure::=Note+

Referring to FIG. 3, MIDI file 304 consists of enough information, i.e. notes, measures and tracks from which to build a component tree using a bottom-up approach with Track as its top component. Given a set of tracks, algorithms described hereafter within part component builder 206 use these Track components to search for repetitive patterns, and with such information constructs the Part components using a bottom-up approach. Melody detector 212 using the algorithms described hereafter and the summarization hierarchy generated by within part component builder 206 detects the Part component which contains the main melody.

Figure 9:
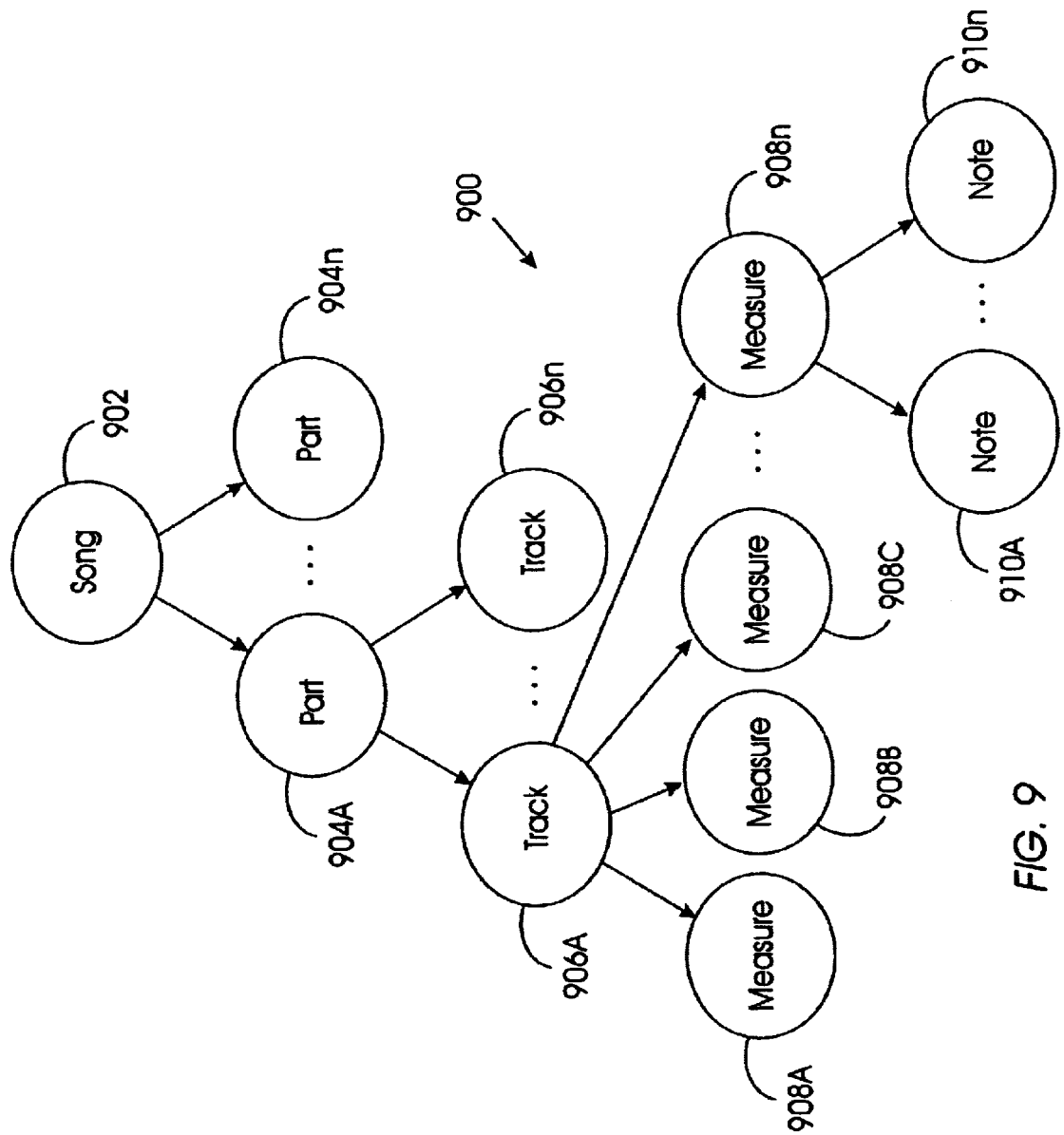
FIG. 9 is a conceptual diagram of a summarization hierarchy illustrating the various components of a musical composition as analyzed by the present invention.

FIG. 9 illustrates a summarization hierarchy 900 as generated by part component builder 206. The summarization hierarchy 900 is essentially a tree of c-components having at its top a Song component 902, the branches from which include one or more Part components 904A-n. Parts 904A-n can be arranged sequentially to form the Song. Each Part component 904A-n, in turn, further comprises a number of Track components 906A-n, as indicated in FIG. 6. Each Track component 908A-n, in turn, comprises a number of Measures components 908A-n. Each Measure component 908A-n, in turn, comprises a number of Note components 910A-n. The summarization hierarchy 210 output from part component builder 206 is supplied as input into melody detector 212.

Depending on the genre the music belongs to there are some additional considerations. Most of today's Rock and Pop music follows a similar scheme, for example ABAB format where A represents a verse and B represents a refrain. Music belonging to different genres (e.g. classical music, jazz, etc.) follows different format schemes.

The format scheme is important during the process of building the component hierarchy as performed by part component builder 206. By applying the genre specific knowledge the music summarization process can produce better results. For example, a typical pop song may have the following form:

| Intro | Verse 1 | Bridge | Refrain | Verse 2 | Bridge | Refrain | Solo | Refrain | Refrain |
|-------|---------|--------|---------|---------|--------|---------|------|---------|---------|

The main theme (Refrain) part occurs the most, followed by the Verse, Bridge and so on.

The structure of a song belonging to the Jazz genre may have the following form:

| Intro | Verse | Verse | Verse | Verse | Verse | Verse | End |
|-------|-------|-------|-------|-------|-------|-------|-----|

With the jazz composition there is no refrain. The main part is the verse which is difficult detect because of the improvisation of the musicians.

The music knowledge base 208 utilizes a style indicator data field defined by the user through GUI 240, or stored in the header of MIDI file 225. The style indicator data field designates which set of knowledge rules on musical theory, such as jazz, classical, pop, etc., are to be utilized to assist the part component builder 206 in creating the summarization hierarchy 210. The codification of the music theory according to specific genres into specific knowledge rules useful by both part component builder 206 and melody detector engine 212 is within the scope of those reasonably skilled in the arts in light of the disclosures set forth herein.

The melody detector 212 reviews the parts of the summarization hierarchy 210, and, using the algorithms set forth in great detail in previously referenced U.S. patent application Ser. No. 09/543,715, entitled "Method and Apparatus For Music Summarization And Creation of Audio Summaries", determines which of the components contains the main melody of the musical piece. The summarization hierarchy 210 is then presented through GUI 240.

Search engine 230 and active digital library 235 of system 200, as well as the actual query submission and search process may be implemented as described in previously referenced U.S. patent application Ser. No. 09/543,111, entitled "Method and Apparatus for Updating a Design by Dynamically Querying Querying an Information Source to Retrieve Related Information" and U.S. patent application Ser. No. 09/543,230, entitled "Method and Apparatus for Determining the Similarity of Complex Designs".

Query Construction Process

Figure 10:
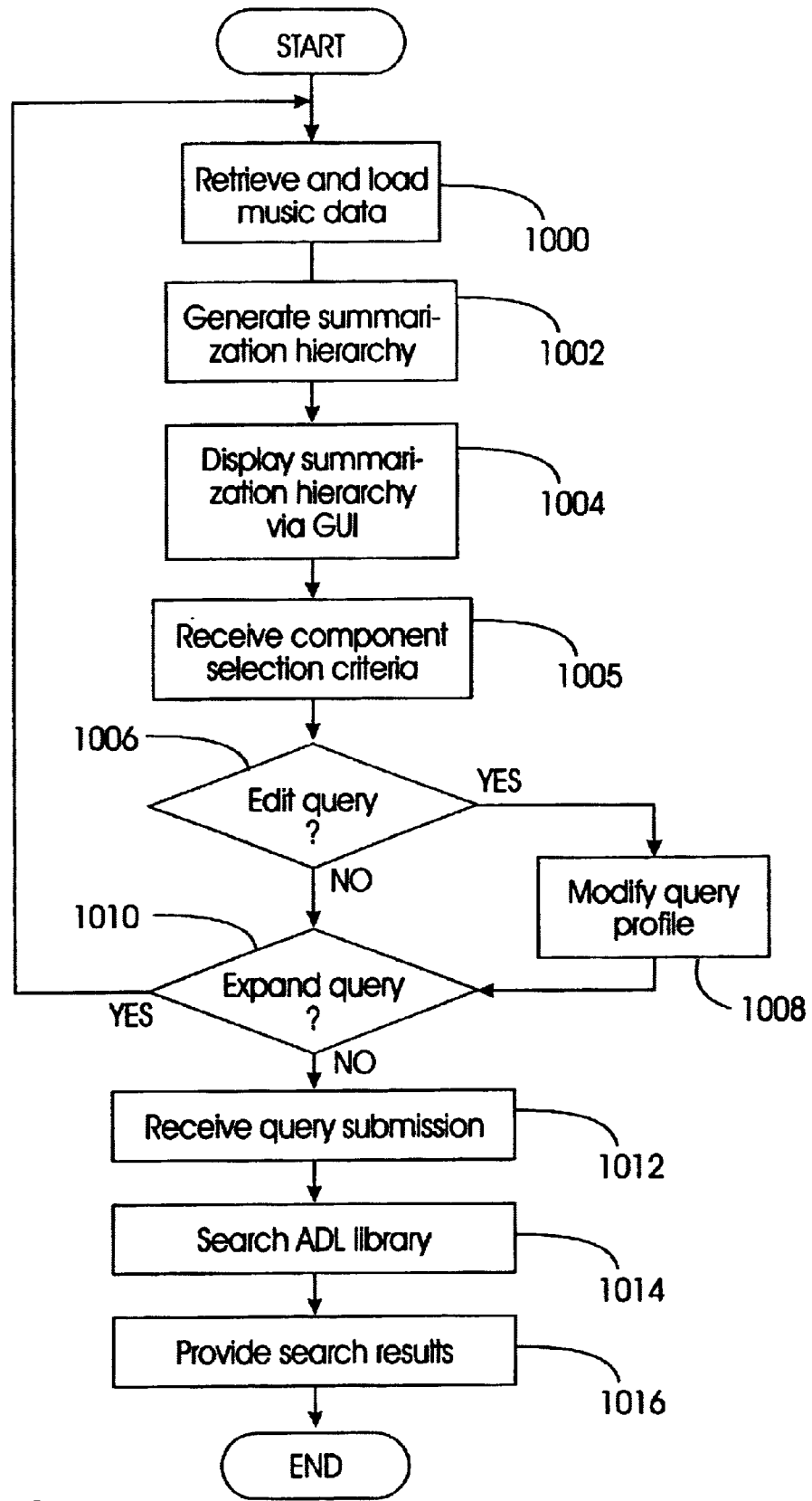
FIG. 10 is a flowchart illustrating the process steps utilized by the audio search engine of the present invention to search audio files.

An illustrative embodiment of system 200 and, specifically, GUI 240 and its operation, is described with reference to a specific example using MIDI files, and to FIGS. 4–10. Referring to FIG. 10, the process begins with step 1000 in which an audio it file, typically a MIDI file, is retrieved and loaded in music player 220 and music analyzer 205. This step may be initiated by typing the URL of the MIDI file, e.g. Elton John's Candle in the Wind music, into address dialog box 250 which is then forwarded to an HTML or other type of a browser program executing on the same platform as system 200. Once the MIDI file is retrieved, and loaded in music player 220 and music analyzer 205, the music analyzer 205 performs the necessary analysis to decompose the music piece into a sequence of structural components.

Briefly, the MIDI file is provided to a MIDI file analyzer 202, analyzes the MIDI data file 304 to arrange the data in standard track-by-track format. The results of the MIDI file analyzer 202 are supplied to a primitive component builder 204 which parses the MIDI file into MIDI primitive data. Thereafter, part component builder 206 detects repetitive patterns within the MIDI data primitives supplied from primitive component builder 204 and builds Parts components therefrom. In an alternative embodiment of the present invention, part component builder 206 may also generate part components from a score notation file, such as that of file 302. Using the detected parts, the part component builder 206 then generates the summarization hierarchy 210. The melody detector 212 determines which part component in the summarization hierarchy contain the main melody. The process by which music analyzer 205 creates a summarization hierarchy from a MIDI file is represented in FIG. 9 as step 1002.

Next, data identifying the structural representation of the song is transmitted to GUI 240 and displayed in the form of a component graph 260, as shown in FIG. 4, including Intro, Verse, Bridge, Refrain, Solo and End components, and represented by step 1004. As shown in FIG. 4, only the part and measure components are displayed graphically in component graph 260. Once at least one section of component graph 260 has been selected, indicating that at least one component of the summarization hierarchy has been selected, a query profile is generated by music analyzer 205, typically as an object in memory using data from the summarization hierarchy and the selection criteria from GUI 240, as illustrated by step 1005. The query profile contains the data defining the selected components, and any associated sub-components, of at least one summarization hierarchy, as well as any associated temporal sequence data and/or Boolean operators, as explained hereinafter.

Note, the specific values displayed in component graph 260 and component caption bar 264 will be different for different music files and different types of music. For example, a classical music piano concerto will have entirely different sequence of structural components than a pop song, such as Elton John's Candle in the Wind. At the same time, music player 220 and all of the controls in music player tool bar 254 are enabled. The users can thus listen to the entire piece of music or any selected components or even parts of components, by simply selecting or highlighting which components, i.e. measure(s), part(s) or the whole song, the user desires to hear and selecting the appropriate control button from music player tool bar 254. In addition, users may manually adjust the starting and the end position of a displayed component by selecting a specific border of the component while dragging this border to the correct position, e.g. with the help of a pointing device. Corresponding adjustments in the component delineation are then made to the summarization hierarchy 210 by music analyzer 205. This feature is provided in case the music analyzer 205 decomposes the music piece in a different way than the user expects, or, the user interprets portions, typically measure (s), of a component ($C_N$) as part of a component ($C_{N+1}$ or $C_{N-1}$).

As shown in FIG. 4, the user has selected two components, the Intro component and the Refrain component. At this time, the user can either play the selected components, or click the Start Search button 252 to issue the query, or refine the query using the query expansion and composition mechanism, via Add button 248. If the user decides to issue the query, the data defining the query profile in its current form are provided to search engine 230, as illustrated by step 1012. Search engine 230 then accesses ADL 235 and compares the component configuration as defined by the submitted query to the summarization hierarchies stored in ADL 235, as illustrated in step 1014. Search engine 230 will attempt to find all music that has a similar Intro and Refrain component as the piece of music.

For every part component of the summarization hierarchy music analyzer 205 creates a caption displaying the structural role of the component based on the analysis results. These captions are displayed on component caption bar 264, as illustrated in FIG. 4. A drop down menu box 268 appears for each of the selected Intro and Refrain components. Within the drop down menu box 268 are caption options for each of the other types of component captions associated with the summarization hierarchy for the subject music piece. Using a pointing device, the user may reassign a different caption, and, therefore a different role, to the selected component in the query. For example, the user may like the Intro so much that he or she wants to see any music that has a Refrain component similar to the selected Intro component. In such case, the user can use the drop down menu box 268 associated with the Intro component to choose Refrain caption before issuing the query. In the illustrative embodiment, changes to structural roles of a component are only possible if the corresponding component is currently selected.

In addition to selecting components, and assigning to them various structural roles in the query, the GUI 240 optionally allows the user to define temporal relationships among the selected components, e.g., the number of times and order in which component occur in the query. As illustrated in FIG. 5, components may be assigned sequence numbers via temporal sequence dialog box 262. Sequence numbers starting at "1" and are assigned by default to components in the order they are selected, for example. Note that user can also mark any selected component as a repeated component. The user can change the default assignment of sequence numbers by selecting a component and typing the sequence number the user wants to assign to this component. GUI 240 will be updated automatically to reflect the sequence changes for the other selected components if necessary. As illustrated in FIG. 5, the Intro component has been designated as the first and third component in the query. As another example, if three components selected, the default sequence number is "1" for the first selected component, "2" for the second selected component and "3" for the third selected component. By selecting component "2" and typing "1" in the temporal sequence dialog box 262, component "1" will be forced to change the sequence order with component "2". No changes needs to be done for component "3". Also, it is possible to assign more numbers to a component using a comma or other delimiter. In such case a component with more than one number will be repeated at the corresponding position (e.g., "1,2" means repeat twice this component or "1,5" means that the subject component is used as the first and the fifth component in the query. The process by which GUI 240 enables a user to edit the summarization hierarchy of a music piece, including redefining component boundaries, reassigning captions/roles to selected components, and defining temporal sequence among the selected components, is represented in FIG. 9 by decisional step 1006 and process step 1008. A key advantage to system 200 is the ability to allow users to incorporate components from different music titles into complex music queries. This process is initiated, once a component from a first music piece has been selected, by selecting ng the Add button 248, as illustrated in FIG. 6. Selection of Add button 248 causes a second address dialog box 250 and Load button 272 to appear. The user may type the URL of another second music piece into dialog box 250, as shown in FIG. 6. Once the second piece of music is loaded, music analyzer 205 performs an analysis, as previously described, and GUI 240 generates a secondary main window 242B to display the sequence of structural components for the second piece, as shown in FIG. 7. In this case, the user has selected the Refrain component from the second music piece. The process of adding components from a second music piece is illustrated in FIG. 10 by decisional block 1010 as well as steps 1000 through 1008, as previously described. Next, GUI 240 allows the user to define the relationship between the selected components of the first and second music pieces via Boolean operator menu 270. System 200 allows the user to select any of the "AND", "OR" and "AND NOT" Boolean relationships, as shown in FIG. 7. In the example of FIG. 8, the user selected the OR relationship, indicating that when the user issues the query, search engine 230 will try to find music that either has a similar Intro and Refrain to the first music piece, or, a similar Refrain to the second piece. Although not shown, the inventive system may allow a temporal relationship between selected components from different music pieces to be defined as will be understood by those skilled in the arts given the disclosures set forth herein.

If the user submits the query, by selecting the Start Search button 252, the data defining the query profile in its current form is provided to search engine 230, as illustrated by step 1012. Search engine 230 then accesses ADL 235 and compares the component configuration as defined by the submitted query to the summarization hierarchies stored in ADL 235, as illustrated in step 1014. The similarity measurement between music components is typically a numeric score (e.g., between 0 to 1), therefore the Boolean relationship may be processed using fuzzy logic operations. The results of the search may be provided to the user through GUI 240 as a list of MIDI file descriptors or in other format.

A software implementation of the above described embodiment(s) may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results.

What is claimed is:

1. A method of creating queries useful in searching for musical content comprising:
   (a) receiving data defining at least a first musical piece;
   (b) decomposing the first musical piece into a structural representation of the first musical piece;
   (c) displaying the structural representation of the first musical piece in the form of a component graph that displays parts and measure components of the first musical piece;
   (d) receiving selection criteria identifying at least a portion of the structural representation of the first musical piece; and
   (e) creating a query profile from the identified portion of the structural representation of the first musical piece.

2. The method of claim 1 further comprising:
   (f) comparing the created query profile to the structural information of at least another musical piece.

3. The method of claim 2 further comprising:
   (g) presenting the results of the comparison of the created query profile to the at least another musical piece.

4. The method of claim 1 wherein step (a) further comprises:
   (a.1) receiving data defining at least a second musical piece.

5. The method of claim 4 wherein step (b) further comprises:
   (b.1) decomposing the second musical piece into a structural representation of the second musical piece.

6. The method of claim 5 wherein step (c) further comprises:
   (c.1) displaying the structural representation of the second musical composition.

7. The method of claim 6 wherein step (d) further comprises:
   (d.1) receiving selection criteria identifying at least a portion of the structural representation of one of the first and second musical pieces.

8. The method of claim 7 wherein step (e) further comprises:
   (e.1) creating a query profile from the identified portion of the structural representation of one of the first and second musical pieces.

9. A computer program product for use with a computer apparatus, the computer program product comprising a computer readable medium having computer usable program code embodied thereon comprising:
   (a) program code configured to receive data defining at least a first musical piece;
   (b) program code configured to decompose the first musical piece into a structural representation of the first musical piece;
   (c) program code configured to display the structural representation of the first musical piece in the form of a component graph that displays parts and measure components of the first musical piece;
   (d) program code configured to receive selection criteria identifying at least a portion of the structural representation of the first musical piece; and
   (e) program code configured to create a query profile from the identified portion of the structural representation of the first musical piece.

10. The computer program product of claim 9 further comprising:
    (f) program code configured to compare the created query profile to the structural information of at least another musical piece.

11. The computer program product of claim 10 further comprising:
    (g) program code configured to present the results of the comparison of the created query profile to the at least another musical piece.

12. The computer program product of claim 9 wherein the program code configured to receive data further comprising:
    (a.1) program code configured to receive data defining at least a second musical piece.

13. The computer program product of claim 12 wherein the -program code configured to decompose further comprises:
    (b.1) program code configured to decompose the second musical piece into a structural representation of the second musical piece.

14. The computer program product of claim 13 wherein the program code configured to display further comprises:
    (c.1) program code configured to display the structural representation of the second musical composition.

15. The computer program product of claim 14 wherein the program code configured to receive selection criteria further comprises:
    (d.1) program code configured to receive selection criteria identifying at least a portion of the structural representation of one of the first and second musical pieces.

16. The computer program product of claim 15 wherein the program code configured. to configured to create a query profile further comprises:
    (e.1) program code configured to create a query profile from the identified portion of the structural representation of one of the first and second musical pieces.

17. In a computer processing apparatus, an apparatus for creating queries useful in searching for musical content, the apparatus comprising:
    (a) a music analyzer configured to receive computer-readable data representing a first musical piece and configured to generate from the computer-readable data a plurality of components representing structural elements of the musical piece;

(b) a user interface configured to display the structural representation of the first musical piece in the form of a component graph that displays parts and measure components of the first musical piece;

(c) program logic coupled to the user interface and configured to receive selection criteria identifying at least a portion of the structural representation of the first musical piece; and (d) a query generator configured to create a query profile from the identified portion of the structural representation of the first musical piece.

18. The apparatus of claim 17 further comprising:

(e) a search engine coupled to the query generator and configured to compare the query profile to the structural information of at least another musical piece.

19. The apparatus of claim 18 further comprising:

(f) program logic configured to present the results of the comparison of the created query profile to the at least another musical piece.

20. The apparatus of claim 17 wherein the a query generator is configured to configured to create a query profile from the identified portion of the structural representation of one of the first and second musical pieces.

* * * * *